United States Patent

Tsai

[11] Patent Number: 5,959,746
[45] Date of Patent: Sep. 28, 1999

[54] LIGHTING SYSTEM HAVING PARTIALLY OVERLAPPING LIGHT SOURCES FOR AN IMAGE SCANNING DEVICE

[76] Inventor: Shui Chuan Tsai, No.3, Alley 80, Lane 108, Sec.1, Kuang-Fu Road, Hsin-Chu, Taipei, Taiwan

[21] Appl. No.: 08/869,118

[22] Filed: Jun. 4, 1997

[51] Int. Cl.⁶ .................................................. H04N 1/04
[52] U.S. Cl. ........................................ 358/475; 358/474
[58] Field of Search .................................. 358/475, 474, 358/487, 494, 497, 488, 483, 408, 471, 482, 509, 505, 506, 486, 401, 400, 449; 399/220, 370, 16; 250/578.1, 234, 235; 362/217, 225, 227, 234, 241, 249, 221, 219

[56] References Cited

U.S. PATENT DOCUMENTS 5,357,412  10/1994  Entrop et al. ........................... 362/219
5,564,818  10/1996  Grossman et al. ..................... 362/221
5,751,447  5/1998  Brook et al. ............................ 358/487

Primary Examiner—Edward L. Coles
Assistant Examiner—Cheukfan Lee
Attorney, Agent, or Firm—Pro-Techtor International Services

[57] ABSTRACT

The present invention relates to a lighting system for a scanning device, emitting light for illuminating a longitudinally extended scanned area, with the light being reflected from the scanned area, travelling along a light path and reaching a detector, the lighting system comprising: at least two illuminating tubes, parallel to the scanned area, longitudinally covering the scanned area, while overlapping each other longitudinally, and being placed on different sides of the light path, such that the scanned area is completely illuminated; and at least two supports, each of the supports accommodating one of the illuminating tubes; wherein the illuminating tubes have small lengths and diameters, allowing for a compact setup, yet the scanned area is illuminated completely, such that a complete image of the scanned area is transmitted to the detector.

7 Claims, 5 Drawing Sheets

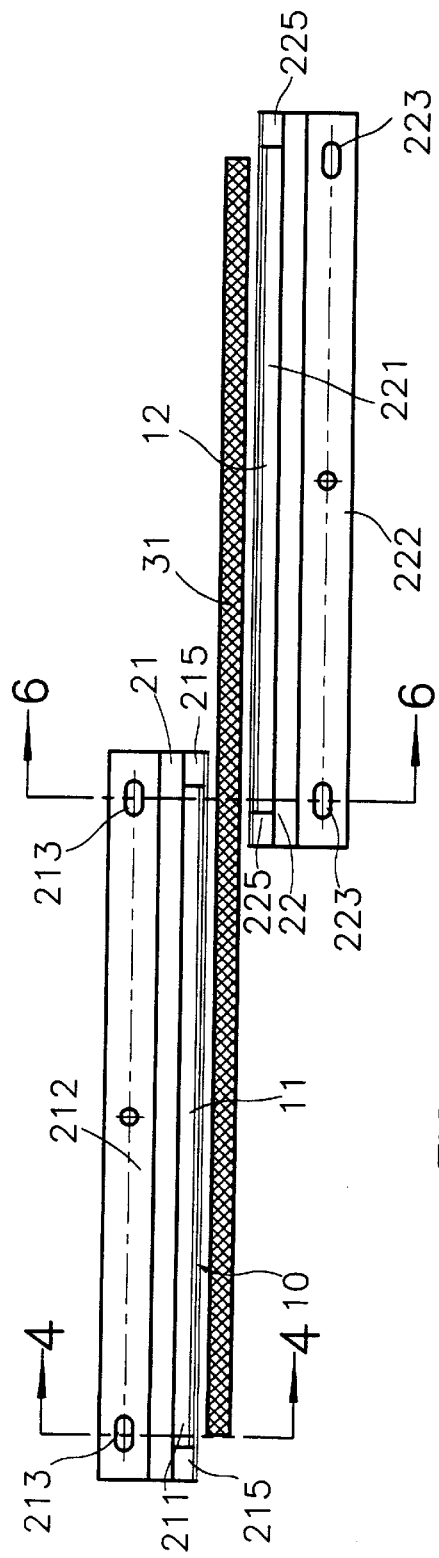
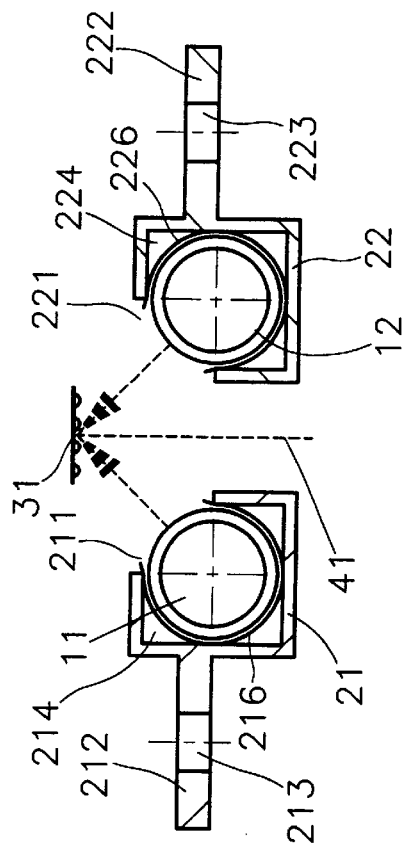
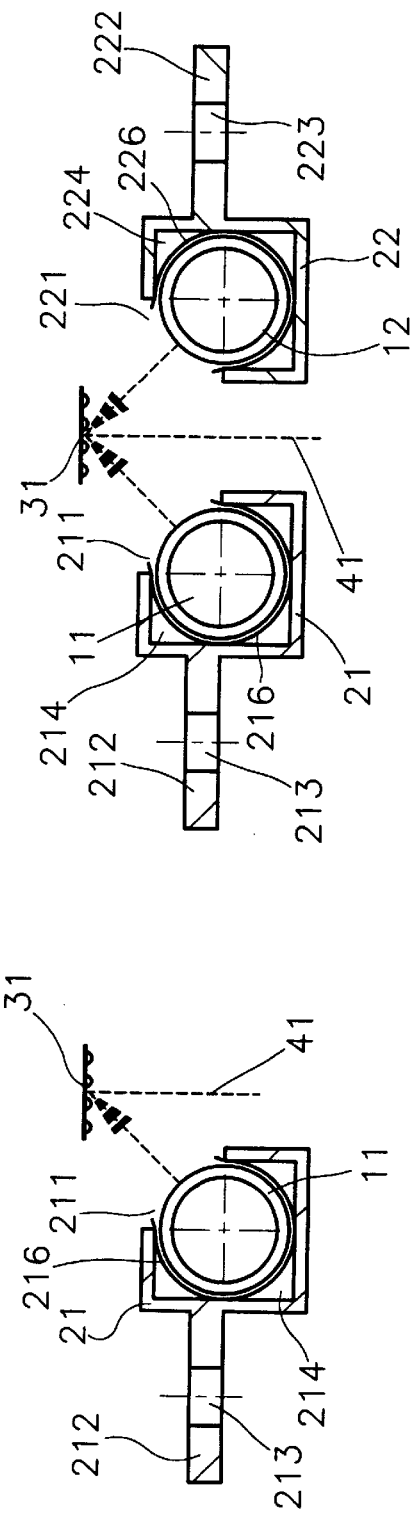
FIG 3
FIG 4
FIG 5

LIGHTING SYSTEM HAVING PARTIALLY OVERLAPPING LIGHT SOURCES FOR AN IMAGE SCANNING DEVICE

BACKGROUND OF THE INVENTION

1. Field of the Invention

The present invention relates to a lighting system for use in an image scanning device, particularly to a lighting system for an image scanning device, which combines a small volume with the capability to illuminate large images.

2. Description of Related Art

Light sources for image scanning devices are light-emitting diodes (LED), halogen lamps, tungsten-filament lamps, fluorescent lamps, and cold-cathode fluorescent lamps. A light source is chosen by virtue of its brightness, its price and the length of the area to be scanned at a time. If a line charge-coupled device (CCD) is used as the light detector in the scanning device, a fluorescent lamp or cold-cathode fluorescent lamp is employed. For the various formats of the scanned objects, the diameter and length of the fluorescent lamp or cold-cathode fluorescent lamp used are different. For example, size standards for fluorescent lamps are 4 w, 6 w, 8 w, 10 w, 20 w, and 40 w. In the same way, various sizes of cold-cathode fluorescent lamps are used, according to the lighting demands. If the scanned object is large, like A2, A1, or A0, a fluorescent lamp is generally of sufficient length.

As shown in FIGS. 8 and 9, the length of a conventional light source 1 for a scanning device has to cover the length of the scanned object 3 completely. Only then uniform lighting along the length of the scanned object is assured. Taking into account the glass material of the light source tube, the length and diameter of the light source have to be made even larger. So the light source takes up a large volume, preventing a compact design of the scanning device.

SUMMARY OF THE INVENTION

The main object of the present invention is to provide a lighting system for an image scanning device, which has a small length and small diameter, while allowing for the scanning of large images.

Another object of the present invention is to provide a lighting system for an image scanning device, which allows to minimize the size of the image scanning device.

The present invention can be more fully understood by reference to the following description and accompanying drawings.

BRIEF DESCRIPTION OF THE DRAWINGS

FIG. 3 is a schematic illustration of the structural parts of the present invention, showing the arrangement thereof with respect to the scanned area.

FIG. 4 is a cross-sectional view, taken along the line A—A in FIG. 3.

FIG. 5 is a cross-sectional view, taken along the line B—B in FIG. 3.

DETAILED DESCRIPTION OF THE PREFERRED EMBODIMENTS

Figure 1:
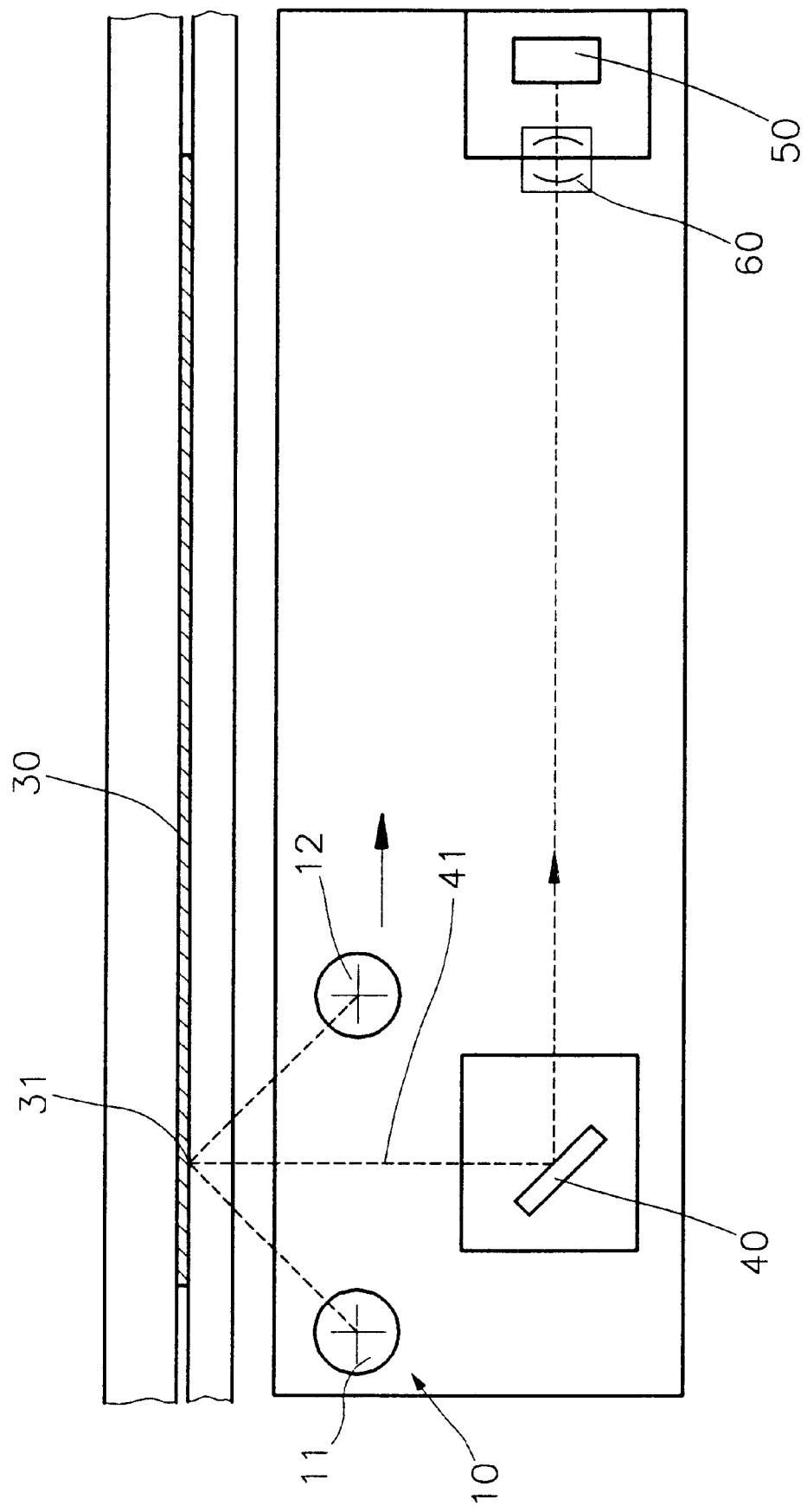
FIG. 1 is a schematic illustration of the structural parts of the present invention, showing the arrangement thereof within the scanning device.

As shown in all Figs., the lighting system for a scanning device of the present invention has several overlapping light sources 10 for a scanned object 30. At a given time, a longitudinally extended scanned area 31 on the scanned object 30 is completely illuminated by the light sources 10. From there, the light is reflected and travels on a light path 41 to a mirror group 40, where it is further reflected, passes through a lens 60 and reaches a detector 50. Alternatively, the light reflected from the scanned area 31 travels directly to the lens 60, passes through the lens 60 and reaches the detector 50 (charge-coupled device).

Figure 2:
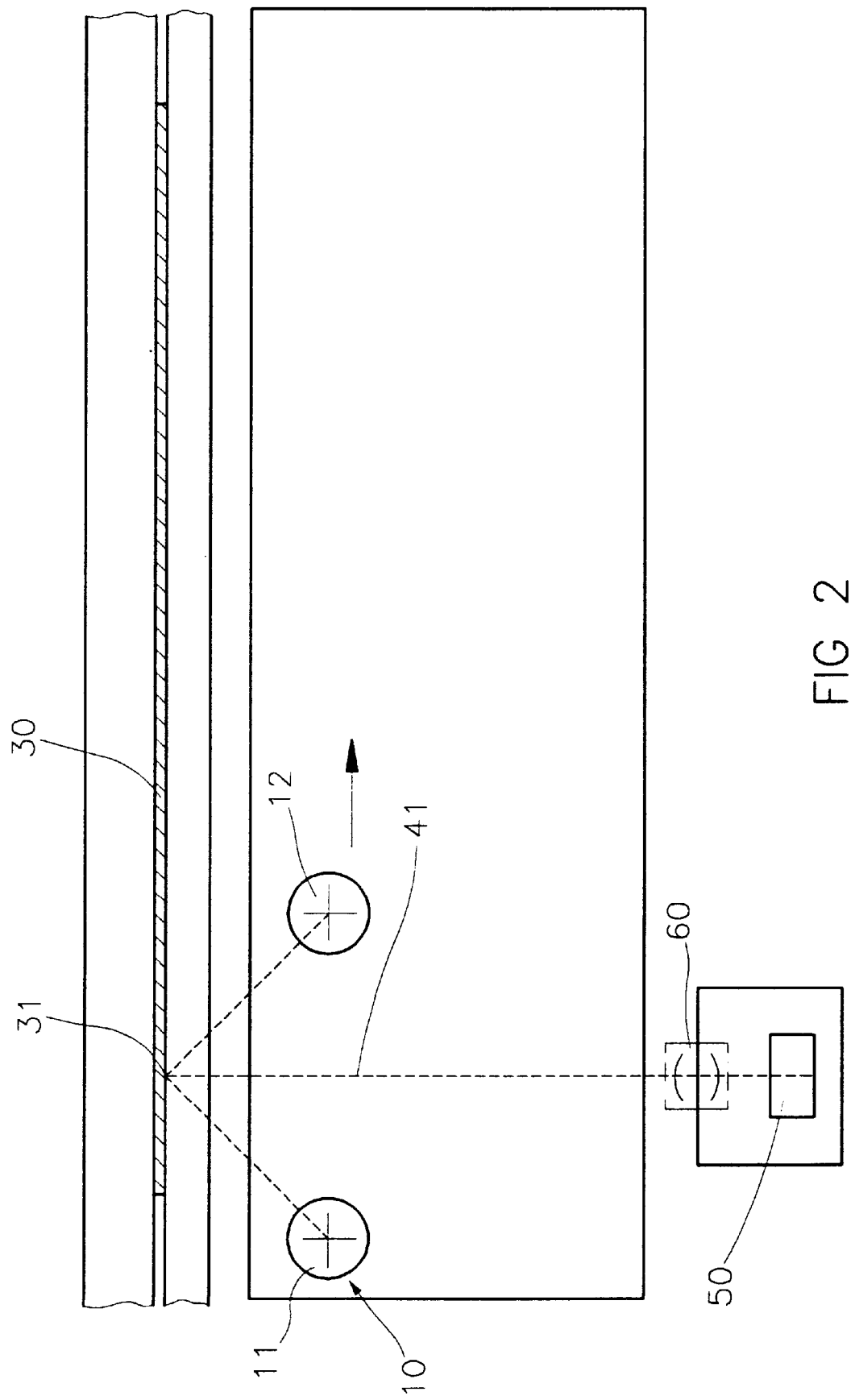
FIG. 2 is a schematic illustration of the structural parts of the present invention in another arrangement, where the light coming from the scanned object is not further reflected by mirrors to reach the detector.

Referring to FIGS. 1, 2 and 3, the light source 10 comprises at least two illuminating tubes 11, 12. The illuminating tubes 11, 12 are oriented parallel to the scanned area 31. They are placed on different transverse sides of the light path 41. The illuminating tube 11 extends longitudinally from one end of the scanned area 31 towards the middle thereof, the illuminating tube 12 extends longitudinally from the other end of the scanned area 31 towards the middle thereof, in a way that the at least two illuminating tubes 11, 12 overlap longitudinally. The at least two illuminating tubes 11, 12 are mounted in supports 21, 22 of corresponding positions and lengths, so as to allow for adjusting the light emitted by the illuminating tubes 11, 12 to optimum quality.

Referring to FIGS. 3, 4 and 5, the supports 21, 22 are longitudinally extended holders with accommodating spaces 214, 224. The illuminating tubes 11, 12 are inserted in the accommodating spaces 214, 224, respectively. End holders 215, 225 hold the illuminating tubes 11, 12 tight. Openings 211, 221 in the supports 21, 22 allow light from the illuminating tubes 11, 12 along the full length thereof to be emitted towards the scanned area 31. To increase the intensity of the light emitted towards the scanned area 31, reflectors 216, 226 surround the illuminating tubes 11, 12 along the full length thereof, except the surface area of the illuminating tubes 11, 12 which is exposed through the openings 211, 221.

The supports 21, 22 further have mounting plates 212, 222, respectively. The mounting plate 212 follows the length of the support 21, extending outward. It has several longitudinally elongated holes 213, in order to fix the support 21 in a position, which is longitudinally adjustable. The mounting plate 222 follows the length of the support 22, extending outward. It has several longitudinally elongated holes 223, in order to fix the support 22 in a position, which is longitudinally adjustable. By adjusting the longitudinal positions of the supports 21, 22, the light intensity on the scanned area 31 is regulated to be nearly uniform, including the sections where the at least two illuminating tubes 11, 12 overlap. Thus a good illumination of the scanned object 30 is obtained.

Since the lighting system for a scanning device of the present invention comprises at least two illuminating tubes 11, 12 with adjustable overlaps, which are placed on different sides of the light path 41 reflected by the scanned area 31, the scanned area 31 is uniformly illuminated. Illuminating tubes of small diameters and lengths can be used, while large areas can be illuminated. Illuminating tubes of small diameters and lengths allow for a setup of small height and thus a small volume of the entire scanning device.

Figure 6:
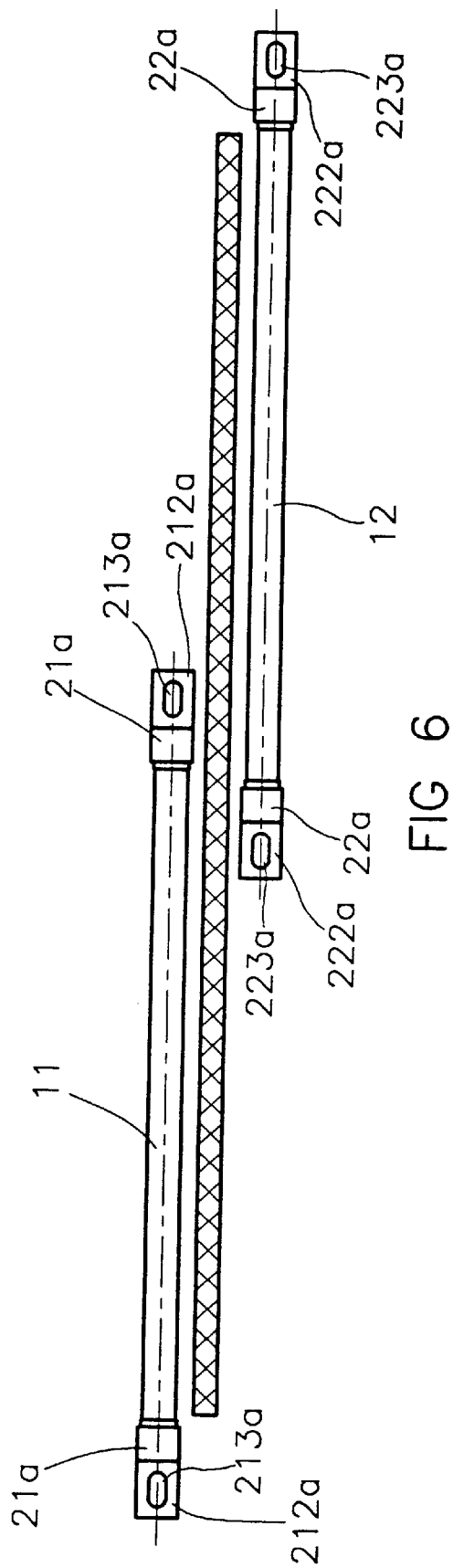
FIG. 6 is a schematic illustration of the structural parts of the present invention in a second embodiment.

As shown in FIG. 6, the lighting system for a scanning device of the present invention in a second embodiment has two end supports 21*a* for the illuminating tube 11 and two end supports 22*a* for the illuminating tube 12. The end supports 21*a*, 22*a* hold the ends of the illuminating tubes 11, 12, respectively. Each end support 21*a*, 22*a* has a mounting plate 212*a*, 222*a*, which extends away from the tube 11, 12. The mounting plates 212*a*, 222*a* have longitudinally elongated holes 213*a*, 223*a* to fix the supports 21*a*, 22*a* in positions, which are each longitudinally adjustable.

Figure 7:
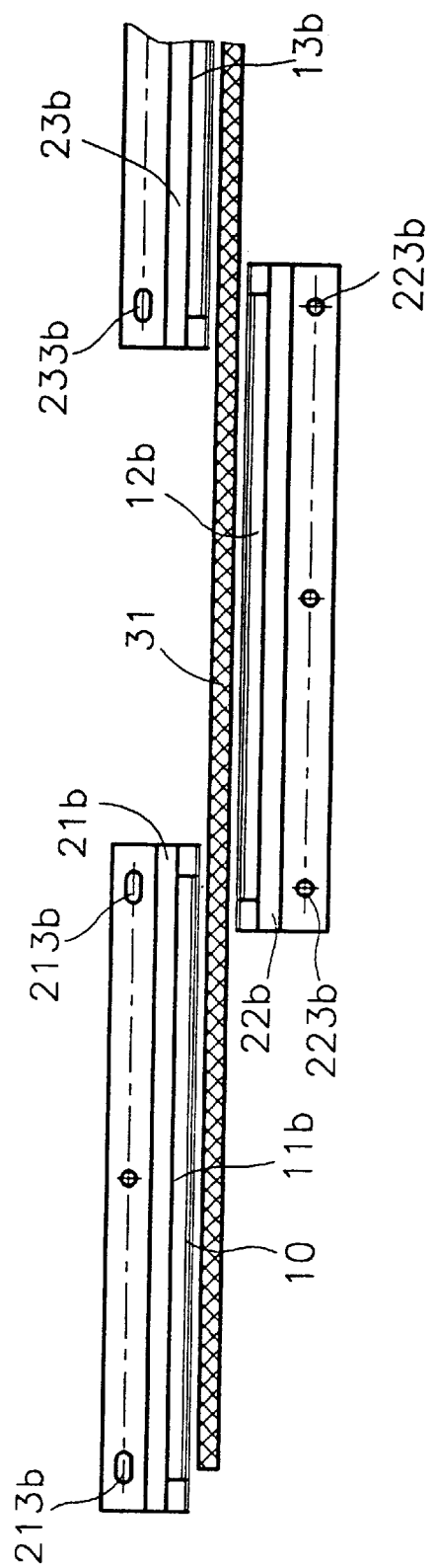
FIG. 7 is a schematic illustration of the structural parts of the present invention in a third embodiment.
Figure 8:
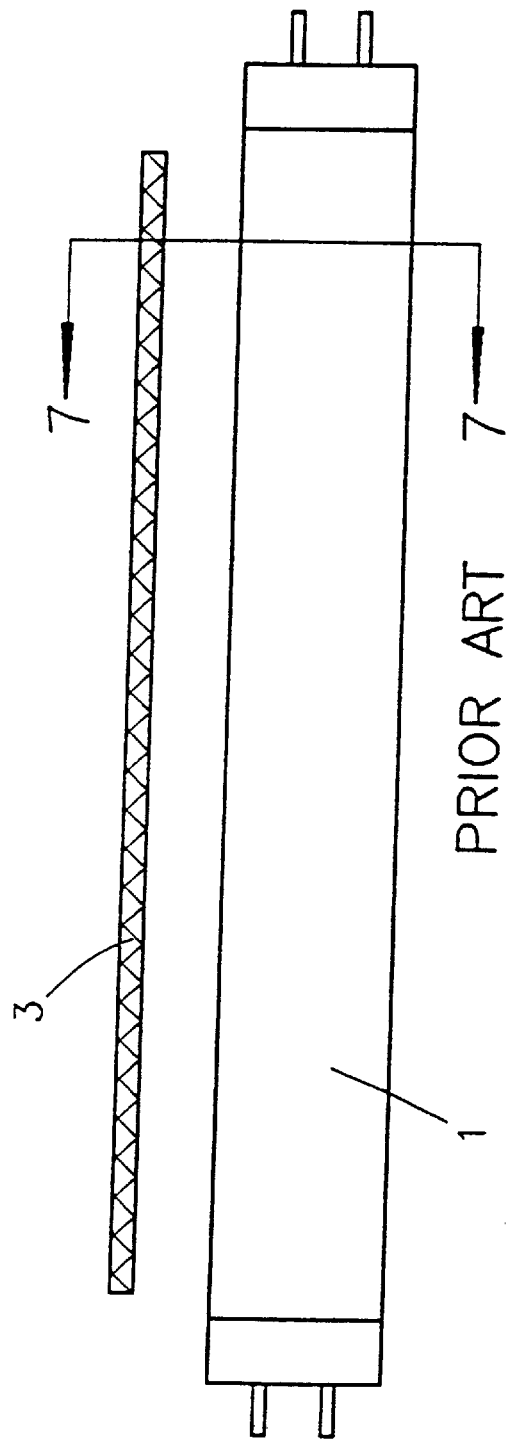
FIG. 8 (prior art) is a schematic illustration of a conventional lighting system for a scanning device.
Figure 9:
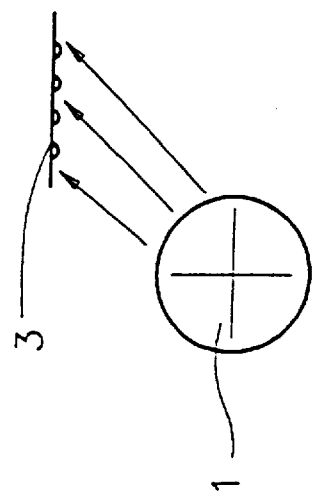
FIG. 9 (prior art) is a cross-sectional view, taken along the line P—P in FIG. 8.

As shown in FIG. 7, the lighting system for a scanning device of the present invention in a third embodiment has three illuminating tubes 11*b*, 12*b*, 13*b*, with adjustable overlaps, which are alternatingly placed on different sides of the light path 41 (not shown). The middle illuminating tube 12*b* is provided with a support 22*b*. The support 22*b* has several fixing holes 223*b*. The other illuminating tubes 11*b*, 13*b* are provided with supports 21*b*, 23*b*. The supports 21*b*, 23*b* each have several longitudinally elongated holes 213*b*, 233*b*, so as to fix the supports 21*b*, 23*b* in positions, which are each longitudinally adjustable. Thereby, the scanned area 31 is illuminated nearly uniformly under various conditions.

What is claimed is:

1. A lighting system for a scanning device, emitting light for illuminating a scanned area, which is extended in a longitudinal direction, with said light being reflected from said scanned area, travelling along a light path and reaching a detector, said lighting system comprising:

at least two illuminating tubes, parallel to said scanned area, longitudinally covering said scanned area, said illuminating tubes partially overlapping each other longitudinally, and being placed on different sides of said light path, such that said scanned area is completely illuminated; and at least two supports, each of said supports accommodating one of said illuminating tubes, allowing said light emitted by said illuminating tubes to illuminate said scanned area;

wherein said illuminating tubes have relatively small lengths and diameters as compared to said scanning device and to said scanned area, yet said scanned area is illuminated completely, such that a complete image of said scanned area is transmitted to said detector.

2. The lighting system for a scanning device according to claim 1, wherein each of said supports has a mounting plate, allowing said support to support one of said illuminating tubes.

3. The lighting system for a scanning device according to claim 2, wherein for each of said supports, said mounting plate has a plurality of adjustment holes for adjusting a position of one of said illuminating tubes, such that by adjusting said positions of said illuminating tubes, a uniform distribution of light intensity on said scanned area is achieved.

4. The lighting system for a scanning device according to claim 3, wherein each of said adjustment holes is elongated in said longitudinal direction.

5. The lighting system for a scanning device according to claim 1, wherein each of said illuminating tubes has two ends, each of said ends are held by one of said supports.

6. The lighting system for a scanning device according to claim 1, wherein each of said supports has an accommodating space to accommodate one of said illuminating tubes, while an opening in each of said supports allows said illuminating tubes to illuminate said scanned area without restriction.

7. The lighting system for a scanning device according to claim 6, wherein for each of said supports, said accommodating spaces are further provided with a reflector for obtaining an increased light intensity on said scanned area.

* * * * *